US012636659B2

(12) United States Patent
Washburn

(10) Patent No.: US 12,636,659 B2
(45) **Date of Patent: *May 26, 2026**

(54) PAN AND METHOD OF PANNING

(71) Applicant: Klinton D. Washburn, Willard, UT (US)

(72) Inventor: Klinton D. Washburn, Willard, UT (US)

( * ) Notice: Subject to any disclaimer, the term of this patent is extended or adjusted under 35 U.S.C. 154(b) by 1049 days.

This patent is subject to a terminal disclaimer.

(21) Appl. No.: 17/511,439

(22) Filed: Oct. 26, 2021

(65) Prior Publication Data

US 2022/0048039 A1 Feb. 17, 2022

Related U.S. Application Data

(63) Continuation-in-part of application No. 15/612,554, filed on Jun. 2, 2017, now Pat. No. 11,185,868.

(60) Provisional application No. 62/344,536, filed on Jun. 2, 2016.

(51) Int. Cl.

*B03B 5/06* (2006.01)
*B03B 5/02* (2006.01)
*B07B 13/08* (2006.01)
*B07B 13/00* (2006.01)

(52) U.S. Cl.

CPC .................. *B03B 5/06* (2013.01); *B03B 5/02* (2013.01); *B07B 13/08* (2013.01); *B07B 13/003* (2013.01)

(58) Field of Classification Search

CPC .. B03B 5/06; B03B 5/02; B07B 13/08; B07B 13/003
USPC .......................................................... 209/447
See application file for complete search history.

(56) References Cited

U.S. PATENT DOCUMENTS

| | | | | |
|---|---|---|---|---|
| 1,064,854 | A | 6/1913 | Ord | |
| 1,240,396 | A * | 9/1917 | Winchester | C22B 11/10 209/43 |
| 1,292,364 | A | 1/1919 | Ord | |
| 1,966,359 | A | 7/1934 | Ryan | |
| 1,972,645 | A | 9/1934 | Danills | |
| 2,178,390 | A | 10/1939 | Boekel | |
| 2,630,226 | A | 3/1953 | Streng | |
| 3,855,119 | A | 12/1974 | Stephenson | |
| 3,970,551 | A | 7/1976 | Wright et al. | |
| 4,162,969 | A | 7/1979 | Lagal | |
| 4,273,648 | A | 6/1981 | Legg | |
| 4,289,241 | A | 9/1981 | Litrap | |
| 4,319,994 | A | 3/1982 | Morgan | |

(Continued)

*Primary Examiner* — Jacob S. Scott
*Assistant Examiner* — Michael E Butler
(74) *Attorney, Agent, or Firm* — Pearson Butler; Jason P. Webb

(57) ABSTRACT

A gold pan and method of panning. A concave pan with lip and an array of curved ribs with linear central regions coupled to and extending above and forward from lip, each rib including a cavity oriented to be orthogonal to the concavity of the pan to trap material flowing thereover. The lip has a front region with a greater radius of curvature than a radius of curvature of a back region. There are a plurality of finishing fins extending into an interior of the concave pan from a back wall or side wall thereof. Panning is performed by disposing particulate material within a provided pan; flowing material over the ribs; flowing material over a plurality of finishing fins; collecting particulate material in a corner of a flat bottom; tipping the pan; and tapping a side thereof to separate heavies.

17 Claims, 7 Drawing Sheets

(56) References Cited

U.S. PATENT DOCUMENTS

| | | | | |
|---|---|---|---|---|
| 4,400,269 | A | 8/1983 | Gordon, Jr. | |
| 4,523,989 | A * | 6/1985 | Graefe | B03B 5/02 209/44 |
| 4,676,891 | A | 6/1987 | Braa et al. | |
| 5,190,158 | A | 3/1993 | Remias | |
| 5,447,239 | A | 9/1995 | Tubbs, Jr. | |
| 5,667,076 | A * | 9/1997 | Rosman | C22B 11/00 209/447 |
| 5,785,182 | A | 7/1998 | Ashcraft | |
| 5,788,293 | A | 8/1998 | Krenzler | |
| 5,859,890 | A | 1/1999 | Shurboff et al. | |
| 5,868,366 | A | 2/1999 | Tubbs, Jr. | |
| 6,095,342 | A | 8/2000 | Ashcraft | |
| 6,341,200 | B1 | 1/2002 | Nakanishi et al. | |
| 11,185,868 | B2 * | 11/2021 | Washburn | B03B 5/06 |
| 2011/0174699 | A1 | 7/2011 | Friend | |

* cited by examiner

PAN AND METHOD OF PANNING

CROSS-REFERENCE TO RELATED APPLICATIONS

This invention claims priority, under 35 U.S.C. § 120, to the United States Provisional Patent Application No. 62/344,536 by Washburn filed on 2 Jun. 2016 and to U.S. patent application Ser. No. 15/612,554 by Washburn filed on 2 Jun. 2017, which are incorporated by reference herein in their entirety.

BACKGROUND OF THE INVENTION

Field of the Invention

The present invention relates to mining tools, specifically to pans (aka gold pans) and methods of use thereof.

Description of the Related Art

Panning is a form of placer mining that extracts dense materials (e.g. gold) from placer deposits using a pan. It is sometimes a precursor to traditional mining, as placer deposits may lead to deposits in the earth from whence they came.

People have been panning and sluicing at least since the time of ancient Rome, where precious metals, including gold, were extracted from mountainsides and streams. Generally speaking, panning is accomplished by scooping alluvial deposits into a pan (aka gold pan, gold wash pan, prospectors pan, gold retrieving pan), which is gently agitated to allow the more dense materials to sink to the bottom. Less dense materials are spilled out of the pan, leaving the more dense materials, which may include gold if done properly in a deposit that includes gold.

Panning takes a great deal of skill as it is easy to miss the gold and/or to accidentally allow the gold to spill out. Further, panning takes a great deal of time and is generally done in an area that is rough and in water that is cold (e.g. mountain streams). Accordingly, it can be very difficult for people to do.

Mining methods have continued to develop and become more efficient. Many of these methods have replaced panning as a technique for industrial and/or commercial extraction of dense metals. However, panning, aka gold panning, has continued to keep a place in mineral exploration, as the equipment requirements are minimal and allow for those searching to easily get a sense of gold in a location. Further, panning has also taken form as a hobby. Therefore, people continue to pan and to develop methods and devices related thereto.

In the related art, it has been known to use panning and pans in searching for heavy metal deposits. Some improvements have been made in the field. Examples of references related to the present invention are described below in their own words, and the supporting teachings of each reference are incorporated by reference herein:

U.S. Pat. No. 1,972,645, issued to Danills, discloses a gold pan having a circular flat bottom, outwardly sloping side walls, a series of riffles in the lower portion of the side walls, said riffles having their bottom walls parallel to the bottom of the pan and their upper Walls substantially at right angles to the side walls and having the interior walls of the riffles meeting in sharp edges.

U.S. Pat. No. 4,162,969, issued to Lagal, discloses a device for separating particles of relatively high specific gravity from particles of relatively low specific gravity wherein the particles to be separated are suspended in a carrier fluid is provided. The device includes a truncated conical shaped surface extending outward from a flat circular bottom surface, the angle of incline of such conical shaped surface being such as to allow the carrier fluid to be swirled easily within the device without excess spillage. The truncated conical shaped surface of the device also includes stepped indentations for up to about one third of the circumference of the conical surface. Each of the stepped indentations include a first surface which is substantially perpendicular to the conical surface and a second surface joined to the first surface at an angle of 90° and extending from the point of juncture with the first surface to points lying in the plane of the conical surface.

U.S. Pat. No. 4,289,241, issued to Litrap, discloses a gold panning and classifying method and system includes a generally rectangularly shaped gold pan having diverging side panels and a plurality of valleys and ridges in the front panel. A plurality of nesting classifying screens are included to effect a first separation of material into portions composed of equivalent size particles. The unique shape of the pan greatly enhances the gravity separation techniques for separating fine sands from gold and gold dust.

U.S. Pat. No. 4,676,891, issued to Braa et al., discloses a portable sluice equipment is provided for miners backpacking into back country to separate out valuable metals from placer deposits. All major components are made from commercially available PVC plastic conduits and fittings. The principal component is a sluice trough manufactured by first longitudinally cutting a plastic pipe in half, and then cutting spaced transverse back angled radial flow channel grooves throughout the sluice trough to initially receive the concentration of heavy metals. Also longitudinal grooves are cut throughout the length of the sluice trough near the respective top edges. Then when periodically, the main flow of sluicing water is stopped, the sluice trough is rotated about its longitudinal axis, and a minimal flow of water is directed transversely to flush the heavy metals from the transverse back angled radial flow channel grooves into the longitudinal groove. Thereafter, the heavy metal is directed downwardly, via the minimal flow of water, in the longitudinal groove and deposited in a transport container. The sluice trough entry end may be fitted with a ninety-degree plastic elbow, in turn supporting a plastic catch basin. A stream water entry may be provided in this elbow to receive stream water, which enters longitudinally above the bottom of the sluice trough to impact the dropping placer deposit material. Also adjustable height spaced bias leg supports are provided, with one being located on each side of the sluice trough, to provide, in combination with a discharge end of the sluice trough, a three point support.

U.S. Pat. No. 585,989, issued to Sletcher, discloses a gold-washing pan, the sides thereof converging from the top toward the bottom and having an inwardly-projecting rib, said bottom having crescent-shaped indentations of curved form laterally and lessening in depth near the ends.

U.S. Pat. No. 634,120, issued to Moore, discloses a prospectors pan comprising a bottom and an outwardly-flared rim rising from the bottom, approximately one half the circumference of the rim having-a smooth inner face from the bottom to the top thereof, the other half or portion of the rim having a series of horizontally-disposed corrugations on its inner face, the corrugations extending from the bottom of the pan to the outer edge of the rim, forming a riffled surface, as and for the purpose specified.

U.S. Pat. No. 1,064,854, issued to Ord, discloses a gold pan provided with a spout inclined outwardly from the bottom thereof, and abruptly projecting outwardly from the peripheral wall of the pan to constitute a wide and relatively shallow pocket throughout its length.

U.S. Pat. No. 5,447,239, issued to Tubbs, discloses a traditional gold pan with a flat center base with a spiral sidewall guide from a vertical pan rim to the pan base incorporates a plurality of obtuse flukes on the spiral extending into the spiral path to disrupt smooth flow of water and mineral matter. A spiraling guide is also provided on the base leading to a cup at the pan center. On the spiraling base guide is a plurality of stratifiers extending from the guide base into an outer spiral path. The pan is continuously rotated by an electric motor linked to the back of the by a belt and pulley.

U.S. Pat. No. 5,667,076, issued to Rosman, discloses an improved gold retrieving pan that is used for either wet or dry gold panning. The pan allows gold dust or gold nuggets to be expeditiously extracted from gold bearing sand. The pan consists of an outer circular section having an inner perimeter rim that is integrally attached to an outer perimeter rim of a shallow center circular section. Near the outer perimeter rim of the center circular section is located a gold trap structure having an outward facing opening and an inward perimeter edge. The edge is attached to the surface of the center circular section. In front of the gold trap structure is located a shallow, gold-setting trough that functions in combination with the gold trap structure to allow any gold dust and/or gold nuggets present in the gold bearing sand to remain within the confines of the gold trap structure and the trough.

U.S. Patent Publication No. 2011/0174699, by Friend, discloses a metal detecting gold pan for speeding the location, identification and recovery of ferrous or non-ferrous metals from parent materials. Metal detecting electronics and sensors in proximity to, connected by cord to, and imbedded in the body of the pan sense and identify metals inside or outside the pan. The metal detecting gold pan is used in the traditional manner, using either wet or dry methods for materials separation. Metals consolidating in the interior of the pan are electronically sensed and identified. Metal bearing parent material external to the pan may be located by using a sensor in the bottom of the pan. Time and effort to reduce overburden and identify materials is greatly reduced during the panning process.

The inventions heretofore known suffer from a number of disadvantages which include: slowly processing panning material, not being effective or being poorly effective, effectiveness being highly dependent on technique/training, losing desired material (e.g. gold) during the process especially in the washing steps and/or to surface tension of water, requiring too many panning steps/cycles, requiring a washing step, allowing too many heavies to be washed out, requiring a swirling step, requiring a prolonged finishing process, being difficult to learn to use, and/or requiring the use of motions that are difficult for users to learn or perform.

What is needed is a pan and/or method of panning that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available pans and panning techniques. Accordingly, the present invention has been developed to provide a pan and method of panning.

In one non-limiting embodiment of the invention, there is a gold pan, including, consisting of, and/or consisting essentially of one or more of: a concave pan having a lip that may extend circumferentially about a top-most portion of the pan; and/or a rib that may be coupled to and/or extending above the lip at a front portion of the concave pan, the rib may include a cavity that may be oriented to be substantially orthogonal to the concavity of the pan such that when the pan is tipped on its front, thereby spilling its contents under gravity, the cavity traps contents therein. There may also be an array of ribs that may be coupled to and extending above and forward from the rib, wherein it may be that each includes a cavity that may be oriented to be substantially orthogonal to the concavity of the pan such that when the pan is tipped on its front, thereby spilling its contents under gravity, the cavity traps contents therein. There may also be a gate panel that may be disposed over a top of the concave pan and/or positioned such that there is a gap between a front of the gate panel and the rib, thereby permitting material to flow between the gate panel and the rib and over the rib but limiting the thickness of such flow.

It may be that the concave pan includes a flat bottom. It may be that the rib is curved and/or includes a linear rib region disposed about a central portion of the rib. It may be that the linear rib region is longer than adjacent curved regions on either side thereof. It may be that the rib is curved in an arc about a center of curvature that lies behind a back side of the concave pan. It may be that the concave pan further comprises a plurality of finishing fins extending into an interior of the concave pan from a back wall or side wall thereof. It may be that the lip of the concave pan has a front region with a greater radius of curvature than a radius of curvature of a back region of the lip of the concave pan.

In another embodiment of the invention, there is a method of panning, that may include, consist of, or consist essentially of, one or more steps oft providing a pan having a plurality of ribs extending upwardly and forwardly from a top of the pan; disposing particulate material within the pan; flowing particulate material over the plurality of ribs; flowing particulate material over a plurality of finishing fins disposed within the pan; collecting particulate material in a corner of a flat bottom of the pan and then tipping the pan and tapping a side thereof to separate heavies within the particulate material; and/or removing heavies from the pan.

It may be that the pan includes a gate panel coupled to a top thereof which forms a gap between an edge of the gate panel and the plurality of ribs and/or one or more other structures described herein.

In still another embodiment, there may be a method of panning, comprising the steps of one or more of: providing a pan having a rib extending upwardly and forwardly from a reservoir of the pan; disposing particulate material within the reservoir; shaking the pan alternatingly back and forth along the rib thereby liquifying the particulate material; tilting the pan forward, thereby flowing liquified particulate material over the rib; and/or tilting the pan toward the secondary rib after the step of tilting the pan forward, thereby flowing residual liquified particulate material over the secondary rib.

It may be that wherein the rib is part of a plurality of ribs extending upwardly and forwardly from the reservoir of the pan. It may be that wherein the step of tilting the pan forward further includes progressively tilting an angle of the pan more forward until substantially all of the liquified particulate material has flowed over the rib. It may be that wherein the step of tilting the pan forward includes wherein the pan is held substantially in a tilted position with a consistent angle while additional particulate material is disposed within the reservoir. It may be that wherein the pan includes a gate panel, and the pan is held substantially in a tilted position with a consistent angle while additional particulate material is disposed within the reservoir behind the gate panel. It may be that wherein the pan includes a gate panel coupled between the reservoir and the rib which forms a gap between an edge of the gate panel and the rib. It may be that wherein the gate panel is selectably removable from the pan. It may be that wherein the pan includes a secondary rib located on a side different from the primary rib.

In still another embodiment of the invention, there is a method of panning, comprising the steps of one or more of: providing a pan having a rib extending upwardly and forwardly from a reservoir of the pan; disposing particulate material within the reservoir; shaking the pan alternatingly back and forth along the rib thereby liquifying the particulate material; tilting the pan forward to an angle wherein liquified particulate material flows over the rib, thereby releasing less dense materials from the pan while trapping heavies behind the rib; and/or tilting the pan toward the secondary rib after the step of tilting the pan forward, thereby flowing residual liquified particulate material over the secondary rib.

It may be that wherein the step of tilting the pan forward includes wherein the pan is held substantially in a tilted position with a consistent angle while additional particulate material is disposed within the reservoir. It may be that wherein the rib is part of a plurality of ribs extending upwardly and forwardly from the reservoir of the pan. It may be that wherein the pan includes a gate panel coupled between the reservoir and the plurality of ribs which forms a gap between an edge of the gate panel and the plurality of ribs. It may be that wherein the step of tilting the pan forward further comprises disposing additional particulate material within the reservoir behind the gate panel. It may be that wherein the gate panel is selectably removable from the pan. It may be that wherein the pan includes a secondary rib located on a side different from the plurality of ribs.

In still yet a further embodiment, there is a method of panning, comprising the steps of one or more of: providing a pan having a plurality of ribs in an array extending upwardly and forwardly from a reservoir of the pan; disposing particulate material within the reservoir, shaking the pan alternatingly back and forth along the plurality of ribs thereby liquifying the particulate material; tilting the pan forward to an angle wherein liquified particulate material flows over the rib, thereby releasing less dense materials from the pan while trapping heavies behind the rib; and/or holding the pan substantially in a tilted position with a consistent angle while additional particulate material is disposed within the reservoir behind the gate panel.

It may be that wherein the pan includes a gate panel that is selectably removably coupled between the pan reservoir and the plurality of ribs which forms a gap between an edge of the gate panel and the plurality of ribs. It may be that wherein the pan includes a secondary rib located on a side different from the plurality of ribs and further comprising tilting the pan toward the secondary rib after the step of tilting the pan forward, thereby flowing residual liquified particulate material over the secondary rib.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

Figure 1:
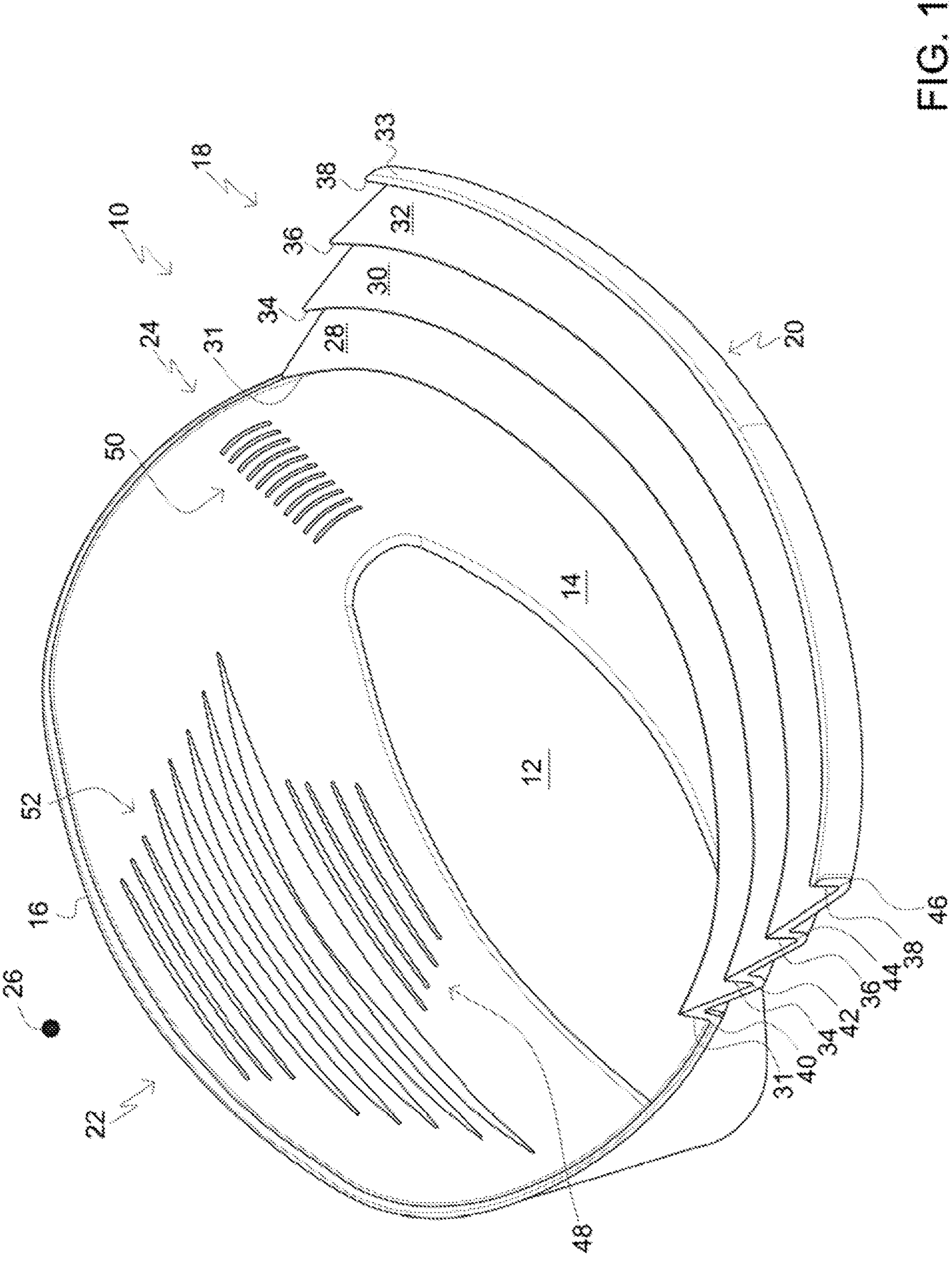
FIG. 1 is a top perspective view of a gold pan, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

As used herein, the terms "pan" and "gold pan" are used synonymously and the prefix "gold" when used with "pan" does not limit the pan to only use with the metal gold.

Figure 2:
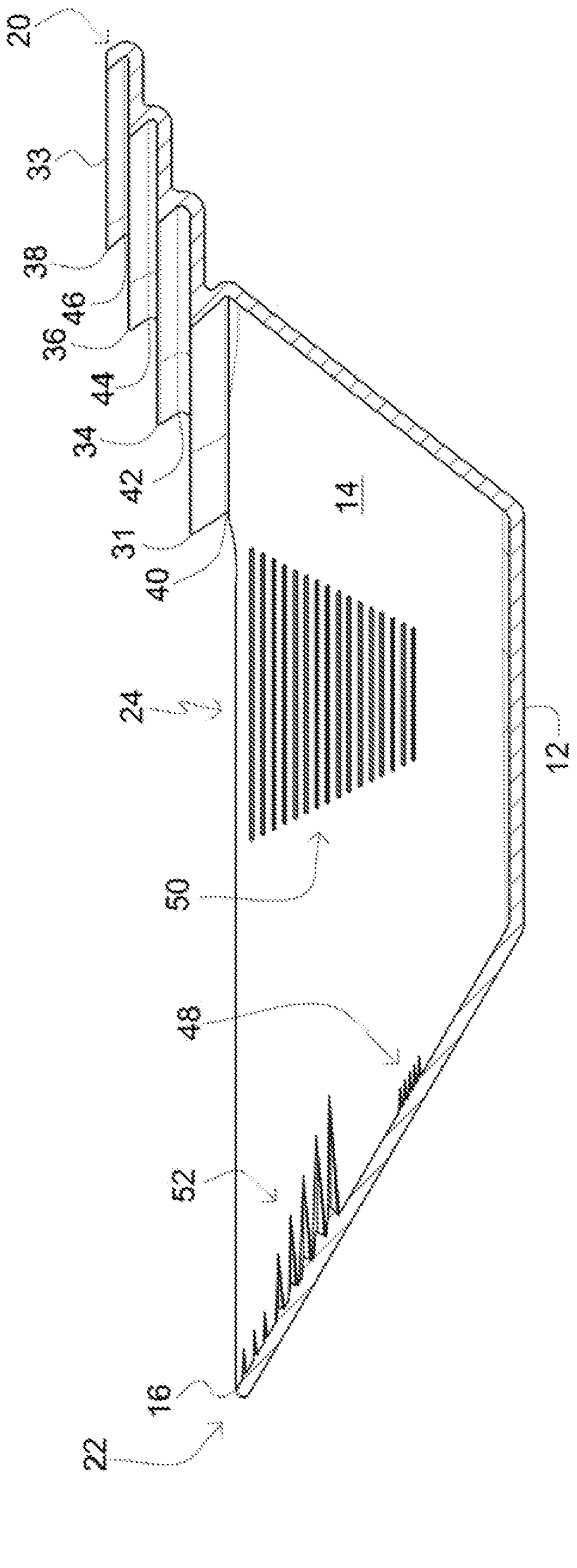
FIG. 2 is a side elevational cross-sectional view of a gold pan, according to one embodiment of the invention.

Looking to FIGS. 1 and 2, FIG. 1 is a top perspective view of a gold pan, according to one embodiment of the invention, and FIG. 2 is a side elevational cross-sectional view of a gold pan, according to one embodiment of the invention. There is shown a gold pan including a plurality of ribs disposed outside of the pan and a plurality of finishing fins disposed within the pan opposite of the plurality of ribs, as well as a funneling corner, a lip, and a flat bottom. The illustrated gold pan may be utilized in a method of panning that includes submersing the pan with material therein within a body of water and agitating the same while tilting the pan so that material flows over the ribs, thus trapping "heavies" (e.g. gold) within the cavities formed by the ribs.

The illustrated gold pan 10 includes a concave pan having a lip 16 extending circumferentially about a top-most portion of the pan. The lip 16 extends about a top of each of the walls of the pan opposite the flat bottom 12.

There is also a rib (a first rib) 28 coupled to and extending above the lip 16 at a front portion 20 of the concave pan and thereby coupled to a front wall 14 thereof such that there are no walls on either side of the rib, so the rib is above the lip and outside of the pan. The rib 28 includes a cavity 40 oriented to be substantially orthogonal to the concavity of the pan such that when the pan is tipped on its front, thereby spilling its contents under gravity, the cavity traps contents therein and when the pan is upright, the rib cavities allow material to spill back towards the pan. The illustrated concave pan includes a flat bottom 12.

There is also shown an array of ribs 30, 32, 33 coupled to and extending above and forward from the rib 28, each including a cavity 42, 44, 46 (respectively) oriented to be substantially orthogonal to the concavity of the pan such that when the pan is tipped on its front, thereby spilling its contents under gravity, the cavities traps contents therein. The illustrated ribs 28, 30, 32, 33 each include flow lips 31, 34, 36, 38 (respectively) over which material spills/flows when panning with the pan. The lips 31, 34, 36, 38 and the associated cavities 40, 42, 44, 46 are curved in an arc and at least the first rib 28 is curved about a center of curvature 26 that lies behind a back side 22 of the concave pan.

The illustrated concave pan further includes a plurality of finishing fins 48, 50 (on the side 24), 52 extending into an interior of the concave pan from a back wall and side wall thereof.

The illustrated gold pan is for panning for heavies, e.g. gold (the word "gold" may be used herein to include other valuable heavy metals, ores, minerals, etc. and is not strictly limited to the raw element, Au), to better help facilitate separation of lighter materials from heavier materials. The gold pan includes a flat bottom surface to support and hold material for processing and separation of materials. The flat bottom surface and other structures within the pan allows for final collection and finishing of heavier materials from the lighter materials.

The illustrated gold pan includes a plurality of ribs extending from and over a lip of the gold pan. The ribs form cavities between each other. The illustrated ribs and cavities are shaped to catch material therein even when the pan is tipped such that the flat bottom is no longer horizontal with respect to gravity. The plurality of ribs are positioned and shaped to provide an efficient material flow over the ribs to separate heavier materials from lighter materials. In particular, the illustrated ribs have a circumferential curvature to them that has a center of curvature that is outside of the pan, for at least one of the ribs, opposite the ribs, such that a wrist of a user during use is proximate the center of curvature. This allows for the user to agitate the pan by pivoting the wrist back and forth. The plurality of ribs each include a cavity to capture the gold during panning/flowing material over the plurality of ribs in standing or running water.

It is advantageous that the material flow over the ribs by action of gravity while the material is in a fluid-type state caused by the agitation of the same within water and not by action of any flowing water. Accordingly, if the pan is used in a body of flowing water, the user may orient the pan to reduce the flow of water therethrough or otherwise shield the pan from such flow.

The gold pan includes a plurality of finishing fins, disposed opposite of the plurality of ribs, wherein the finishing fins are disposed within the interior of the gold pan. The finishing fins enable a user to capture the fine gold particles or the smaller heavier materials from the lighter materials. The plurality of finishing fins each include a cavity to capture the heavier materials when processing materials are flowed thereover. Generally, the pan will be filled with material and processed over the ribs. The remaining material may then be processed on the flat bottom surface and/or using finishing fins. The illustrated fins are progressively smaller (shorter in width and in height from the wall of the pan) such that near the lip of the pan such fins merely slow/stall material from exiting the pan so that the user can visually inspect material before it exits during gently washing. The gold pan includes a funneling corner disposed between the plurality of ribs and the plurality of finishing fins along a side of the gold pan; wherein the funneling corner enables a smooth surface to pour the contents of the gold pan out thereof.

According to one embodiment of the invention, there is a gold pan and a method of use thereof, wherein instead of processing the material inside the pan, a user is forcing the material to flow across the edges of a plurality of ribs and fins and into the capturing cavities of the gold pan. The oscillations cause liquefaction of the material (generally mixed granular minerals (e.g. sand, dirt) found in stream beds), which allows the material to flow and also allows stratification thereof. Flow during liquefaction allows the material to move and get out of the pan, so long as they traverse the illustrated ribs. Stratification that occurs within the material during this flow allows the lighter material to rise up and out while the heavier materials sink into the capture areas (cavities).

The method happens underwater to prevent surface tension from letting small heavies float on the surface and thereby wash out. The oscillation may be done either linearly or in an arc (e.g. about the center-point of the wrist). Linear oscillation allows for a bigger and heavier pan (e.g. two handed use), while an arc oscillation is more naturally performed with a single hand pivoting about the wrist. To get the recovered material out easily, there is a flat bottom which allows the user to tap with the pan at a slight angle with respect to gravity which allows the heavier materials to roll out from under the lighter materials that remain. If the bottom surface is curved, as many pans are, then the gold is less likely to run ahead of the lighter material and runs a shorter distance when it does.

The illustrated pan has funneling corners that allow the user to funnel the captured material into a vial. There are finishing fins inside the pan. The capturing cavities may be curved with a curvature having an effective radius greater than the distance to the center of the pan (e.g. the effective radius may substantially coincide with placement of a wrist of a user during one-handed oscillation).

The illustrated gold pan is designed to provide a faster and more efficient method to processing material. The gold pan includes a plurality of ribs disposed along a front side of the gold pan. The plurality of ribs includes a step-configuration, wherein when material is flowed there over, the heavier materials are captured within a cavity of the plurality of ribs. The front side of the gold pan and the positioning of the plurality of ribs provides an angle wherein material is easily flowed over the plurality of ribs and the lighter material is separated from the heavier materials; wherein the heavier materials is captured within the gold pan.

There may be flat/linear rib regions (See FIG. 3) near the center of the ribs that is not curved for a region so that the flow region can be larger and therefore you can increase the flow rate of the material since gravity will pull the material to the "bottom" of the ridges. Such a linear rib region effectively widens the "bottom" of the ridges and allows for faster material processing. It may be that the bottom of one or more of the cavities between the ribs are still curved in that same linear rib region so that the arc-path of the agitation operates the same within all regions of the cavities.

In one non-limiting embodiment, one or more floats are attached to the pan to allow for the pan to be submerged within a body of water at a depth defined by the coupling between the float(s) and the pan. Thereby, a user could continuously fill and agitate the pan.

In one non-limiting embodiment, the pan may be coupled to an agitating motor in a manner that allows the pan to be agitated in a non-manual manner.

In one non-limiting embodiment, the pan may be coupled to a loading structure (e.g. funnel, trough, chute) such that an exit of the loading structure is disposed near the pan such that material exiting the same enters the pan.

In one non-limiting embodiment, there is a gold pan having ribs exterior to a lip of the pan, wherein the ribs have cavities therebetween and have a larger effective radius of curvature than the distance to a center of the pan.

In one non-limiting embodiment, there is a gold pan, consisting of or consisting essentially of a concave pan having a flat bottom, a smooth or textured interior surface, and a lip extending circumferentially about a top-most portion of the pan; and an array of ribs coupled to and extending above and forward from lip at a front portion of the concave pan, each rib of the array of ribs including a cavity oriented to be substantially orthogonal to the concavity of the pan such that when the pan is tipped on its front, thereby spilling its contents under gravity, the cavity traps contents therein. One or more ribs of the array of ribs is a curved rib that is curved in an arc about a center of curvature that lies behind a back side of the concave pan. The curved rib(s) may each include a linear rib region disposed about a central portion of the rib. The lip of the concave pan has a front region with a greater radius of curvature than a radius of curvature of a back region of the lip of the concave pan. A textured interior surface of the concave pan is textured such that it includes a plurality of finishing fins extending into an interior of the concave pan from a back wall or side wall thereof.

According to one embodiment of the invention, there is a gold pan having a flat bottom, a plurality of ribs disposed on an exterior of the gold pan along a front side with a curvature having an effective radius greater than the center of the pan. The plurality of ribs includes a flat region to capture heavier materials. The gold pan includes a plurality of finishing fins disposed on a back side in an array; wherein the finishing fins includes a tighter radius than the radius of the plurality of ribs. The illustrated finishing fins includes a back array of fins which has an array of tiny fins followed by large fins that taper to small fins, then followed by another array of tiny fins. The plurality of finishing fins are used to prevent any accidental loss of heavier materials when finishing over the larger fins.

The illustrated gold pan provides faster panning, more effective panning, fewer panning steps, skips washing step, fewer of the heavier materials get washed out, eliminates the swirling step, faster finishing, easier to learn, and simpler motions that do not require advanced technique.

Figure 3:
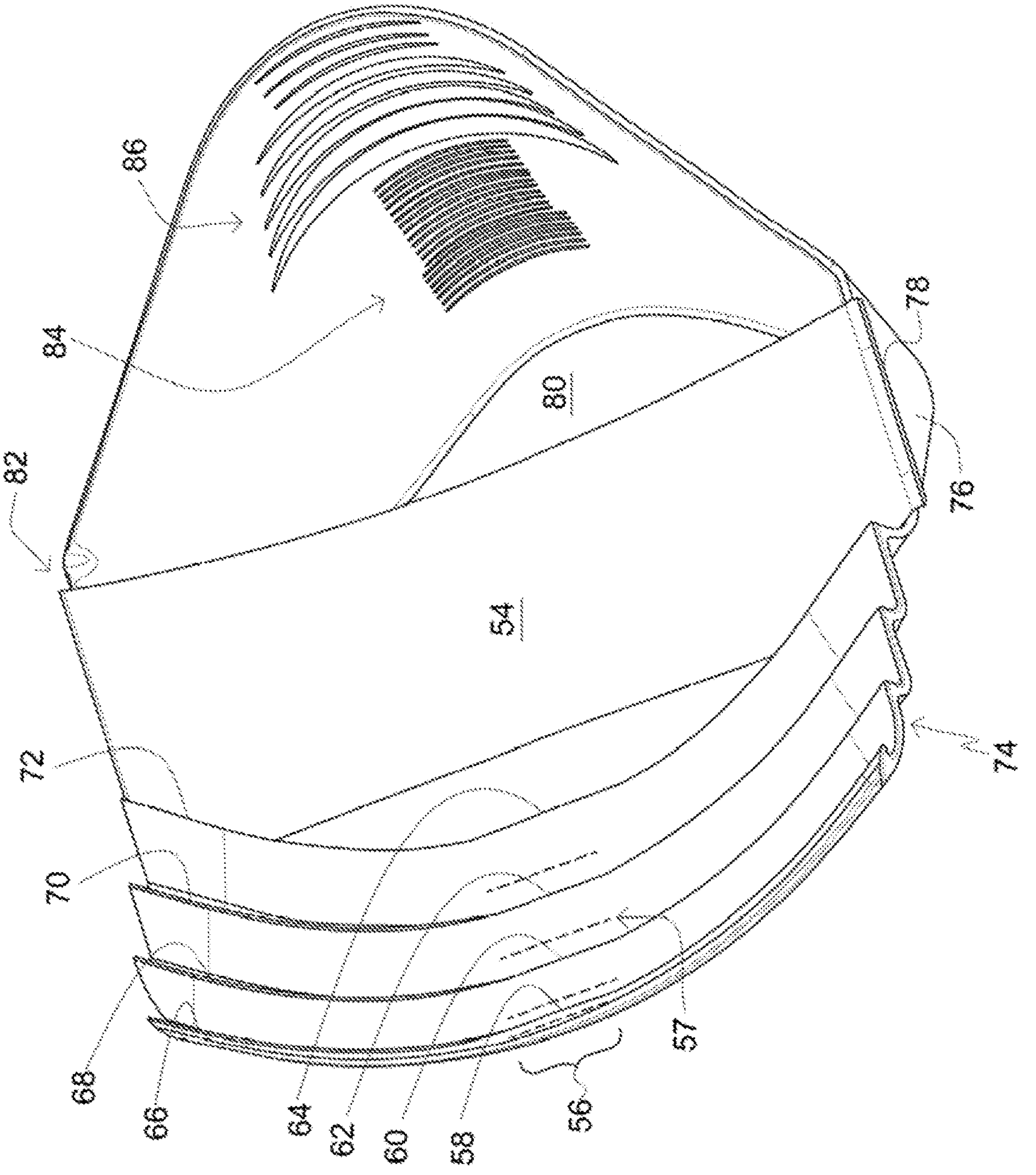
FIG. 3 is a top perspective view of a gold pan, according to one embodiment of the invention.

FIG. 3 is a top perspective view of a gold pan, according to one embodiment of the invention. There is shown a gold pan including a plurality of ribs disposed on a front side of the gold pan, a plurality of finishing fins disposed on an opposite side of the plurality of ribs, and a gate disposed between on the plurality of ribs and the plurality of finishing fins. The illustrated ribs each include a linear region near the center thereof which widens the flow area over which material flows during operation of the gold pan. There is also shown a gate which prevents material from flowing over the ribs at a thickness greater than about the spacing between each rib. Such helps prevent material from accidentally flowing over the top of the ribs without interacting therewith.

The illustrated pan includes a plurality of curved ribs 74 each including a flow lip 66, 68, 70, 72 (respectively) and a linear rib region 58, 60, 62, 64 (linear flow lips) and 57 (the dotted lines are linear cavity portions for each respective rib) disposed about a central portion 56 of the respective ribs. The linear regions advantageously improve the efficiency and performance of the pan while panning and provide a more consistent flow path for material to flow over the ribs. There is also shown a flat bottom 80.

There is a gate panel 54 disposed over a top of the concave pan by a friction fit clip 78 coupled to a side wall 76 thereof. The gate panel 54 is positioned such that there is a gap between a front of the gate panel and the first (closest to the lip of the pan) rib, thereby permitting material to flow between the gate panel 54 and the rib and over the rib but limiting the thickness of such flow. There is a notch 82 through the lip near the gate panel.

The lip of the concave pan has a front region having arrays of finishing fins 84, 86. The lip of the front region where the ribs 74 are disposed has a greater radius of curvature than a radius of curvature of a back region of the lip of the concave pan.

The illustrated gold pan is used to pan for gold. The gold pan better helps facilitate separation of lighter materials from heavier materials during process of materials. The gold pan includes a gate disposed over a top of the gold pan to prevent material from crossing a plurality of ribs at too great a height. The gate is designed to limit flow of material to that of a predefined height/thickness/depth over the plurality of ribs to facilitate separation between heavier materials and lighter materials and to prevent material at the top of the flow body from merely "flying/floating over" the ribs and not interacting therewith. Without a gate, the angle of the pan must change as the material is processed and less and less material is within the pan in order to maintain a thin layer of material over the ribs. The gate allows the pan to remain at a constant angle and still maintain the thin layer of material over the ribs as the quantity of material in the pan changes. Therefore, the gate enables further additions such as but not limited to floats and/or continuous feed structures that are more effective if the pan can maintain a constant orientation.

The gold pan includes a plurality of ribs disposed over a lip of the gold pan. The plurality of ribs are positioned and angled to provide an efficient material flow over the ribs to separate heavier materials from lighter materials. The plurality of ribs each include a cavity to capture the gold during panning/flowing material over the plurality of ribs in standing or running water.

The gold pan includes a plurality of finishing fins, disposed opposite of the plurality of ribs, wherein the finishing fins are disposed within the interior of the gold pan. The illustrated finishing fins are presented in two arrays, the array closer to the bottom of the pan being an array of short (length and height) fins while the second array, further from the bottom, is a set of progressively smaller fins that start out much larger than the first array and get progressively smaller towards the lip of the pan. A user may trap material within the second array and then tip the pan back towards horizontal and process the trapped material across the first array.

Finishing fins enable a user to capture the fine gold particles or the smaller heavier materials from the lighter materials. The plurality of finishing fins each include a cavity to capture the heavier materials when processing materials are flowed thereover. The illustrated plurality of finishing fins includes a plurality of tiny fins and a plurality of large fins; wherein the tiny fins are disposed towards a bottom of the gold pan and large fins are disposed above the tiny fins and a plurality of medium sized fins are disposed at the top of the gold pan, near a lip to facilitate efficient gold panning.

According to one embodiment of the invention, there is a plurality of exterior ribs extending from a gold pan having a larger effective radius of curvature (geometry closer to the natural motion when doing the action to liquefy the material underwater). The curvature of the plurality of ribs help facilitate efficient processing of materials over the plurality of ribs, thereby separating heavier materials from lighter materials.

Figure 4:
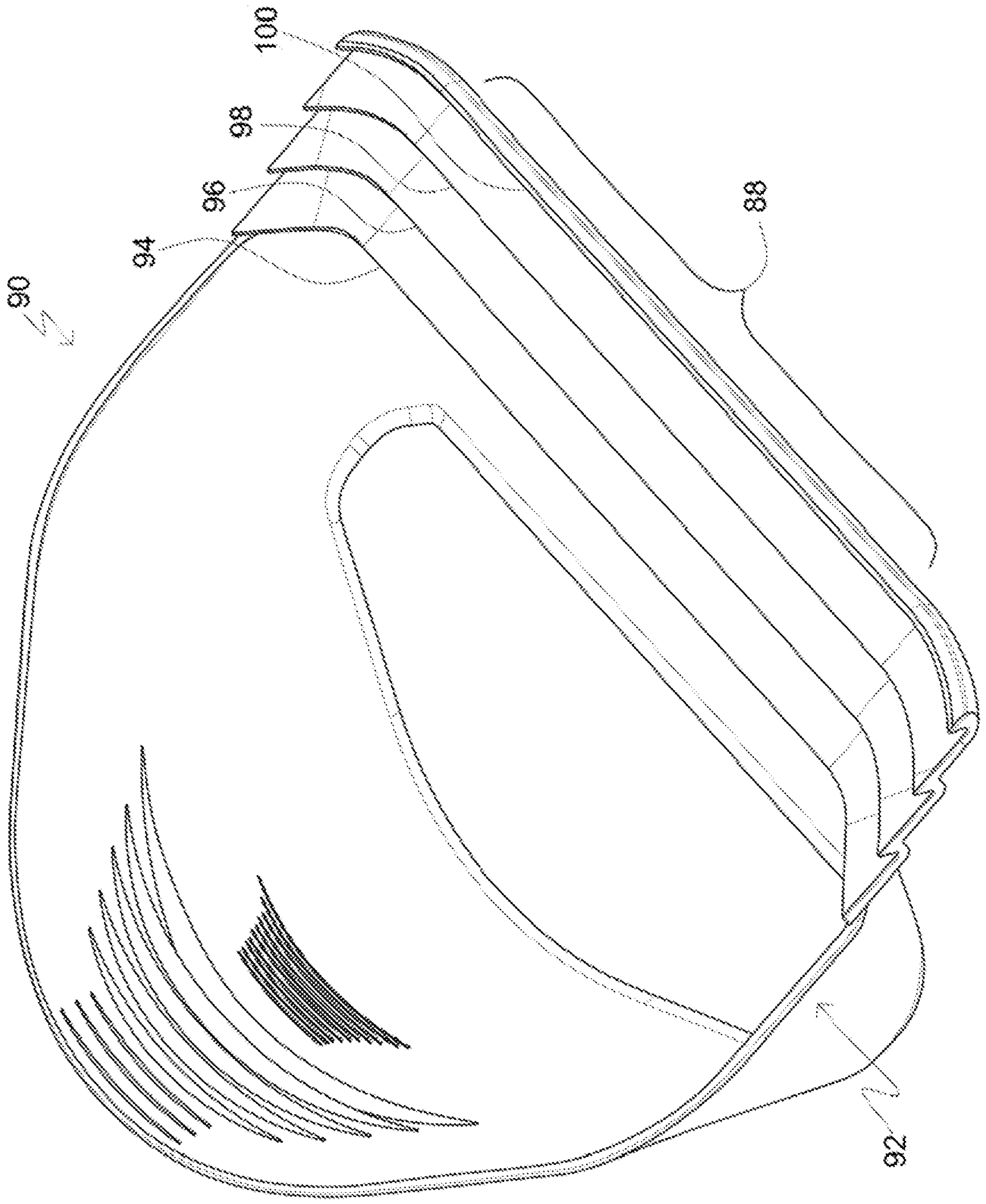
FIG. 4 is a top perspective view of a gold pan, according to one embodiment of the invention.

FIG. 4 is a top perspective view of a gold pan, according to one embodiment of the invention. There is shown a gold pan including a plurality of ribs, a plurality of finishing fins, a flat bottom surface, and a plurality of side finishing fins. The illustrated pan includes long linear ribs and is configured to two-handed use wherein agitation is linear and not pivoting about a wrist. Generally a user will place a hand on each side of the pan with the ribs facing away from the user and then tip the pan so that the material and ribs are submerged in water and then shake the pan back and forth substantially parallel with the chest of the user and this liquefy the material and process it to flow over the ribs.

The illustrated pan includes a plurality of ribs 94, 96, 98, 100 in an array extending forward and upward from a lip of the pan adjacent to side walls 90, 92. Each rib includes a linear rib region 88 that is flanked by curved regions. The illustrated linear rib region 88 is longer than adjacent curved regions on either side thereof. The illustrated pan is deep and wide and the elongated linear regions allow for increased material flow. Accordingly, a user of such a pan may grip each side 90, 92 in their hands, one hand on each side, while panning and while tipping the pan forward shake the pan from side to side (as opposed to the single hand grip of FIG. 5 and the pivoting wrist motion of FIG. 7). This grip and action requires greater strength and involves more muscles but advantageously allows one to process material faster. Where two people are working together, one may shovel material into the tipped pan while the other continuously shakes the same.

The illustrated gold pan is designed to provide a faster and more efficient method of processing material, specifically separating heavier materials from lighter materials. The gold pan includes a plurality of ribs disposed along a front side of the gold pan. The plurality of ribs includes a step-configuration, wherein when material is flowed there over, the heavier materials are captured within a cavity of the plurality of ribs. The front side of the gold pan and the positioning of the plurality of ribs provides an angle wherein material is easily flowed over the plurality of ribs and the lighter material is separated from the heavier materials; wherein the heavier materials is captured within the gold pan.

The illustrated gold pan includes a plurality of finishing fins; wherein the plurality of finishing fins are used to process the material left over from processing the materials over the plurality of ribs. The plurality of finishing fins includes a plurality of tiny fins and a plurality of large fins disposed in a configuration to optimize the capturing or heavier materials from lighter materials. The illustrated gold pan includes a plurality of side finishing fins disposed along a side of the gold pan, between the plurality of ribs and the plurality of finishing fins. The gold pan includes a flat bottom surface to support and hold material for processing and separation of materials therein. The flat bottom surface allows for final collection of heavier materials from the lighter materials.

Figure 5:
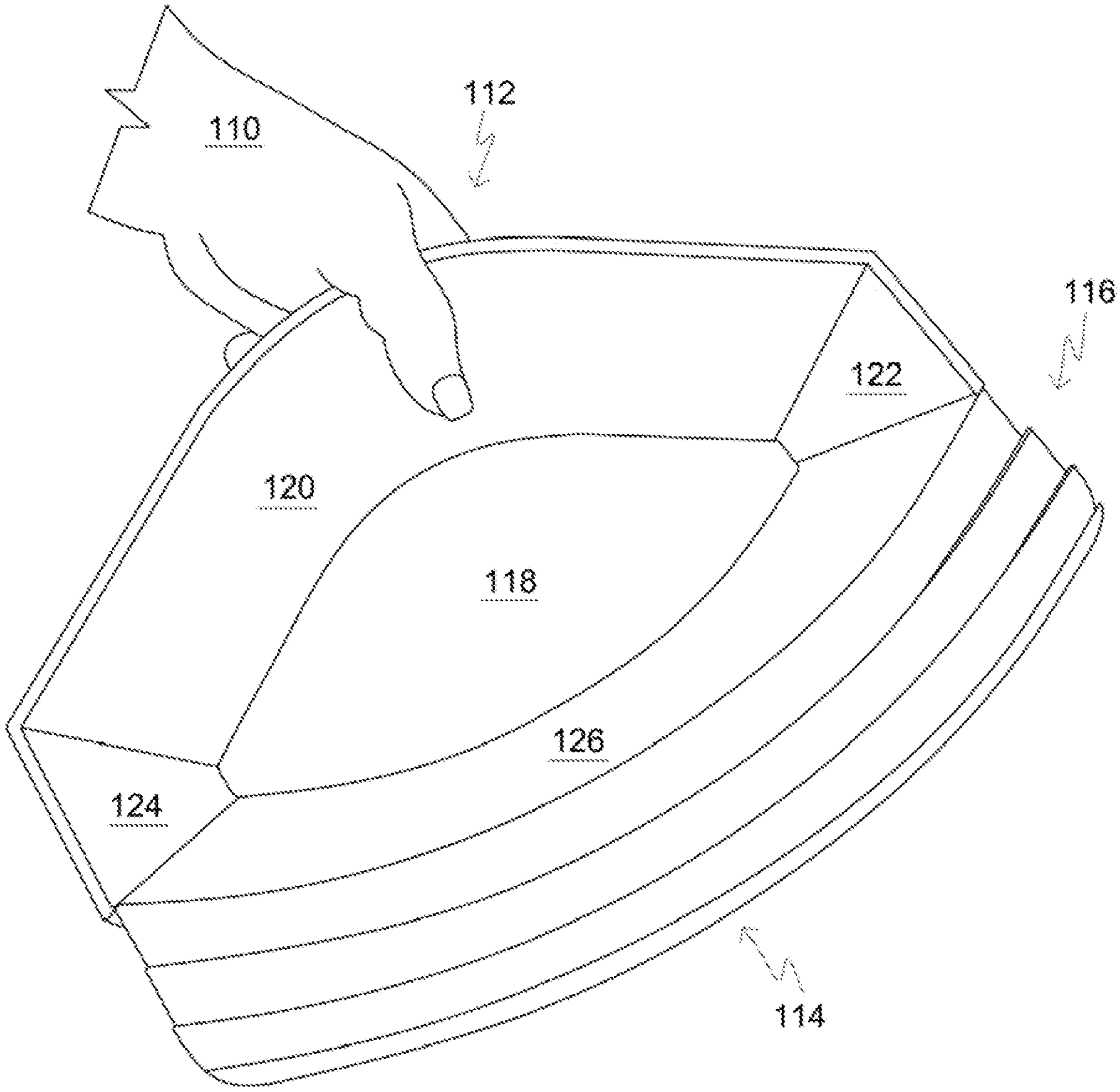
FIG. 5 is a top perspective view of a method of operating a gold pan, according to one embodiment of the invention.

FIG. 5 is a top perspective view of a method of operating a gold pan, according to one embodiment of the invention. There is shown a gold pan including a plurality of ribs 116, a front wall 126, a back wall 120, side walls 124 and 122 which may operate as funneling corners, a lip, and a flat bottom 118. The illustrated ribs are disposed at a front region 114 of the pan while the user grips the back region 112 with a hand 110.

The illustrated gold pan is for panning for gold, to better help facilitate separation of lighter materials from heavier materials. The gold pan includes a flat bottom surface to support and hold material for processing and separation of materials. The flat bottom surface allows for final collection of heavier materials from the lighter materials. The gold pan includes a plurality of ribs disposed over a lip of the gold pan. The plurality of ribs are positioned and angled to provide an efficient material flow over the ribs to separate heavier materials from lighter materials. The plurality of ribs each include a cavity to capture the gold during panning/flowing material over the plurality of ribs in standing or running water.

The gold pan includes a plurality of finishing fins, disposed opposite of the plurality of ribs, wherein the finishing fins are disposed within the interior of the gold pan. The finishing fins enable a user to capture the fine gold particles or the smaller heavier materials from the lighter materials. The plurality of finishing fins each include a cavity to capture the heavier materials when processing materials are flowed thereover. The gold pan includes a funneling corner disposed between the plurality of ribs and the plurality of finishing fins along a side of the gold pan; wherein the funneling corner enables a smooth surface to pour the contents of the gold pan out thereof.

What makes this unique is that the manual actuation creates a gravity flow of the material so that the heavy materials will displace the lighter ones in the cavities. These cavities are placed on the rim of the container so that all the contents may flow over the groves in a thin layer. This all takes place submerged in a liquid to manage surface tension. You would partially submerge the pan while manually actuating. Any of the techniques described herein may also work with dry panning, wherein no fluid is involved.

Figure 6:
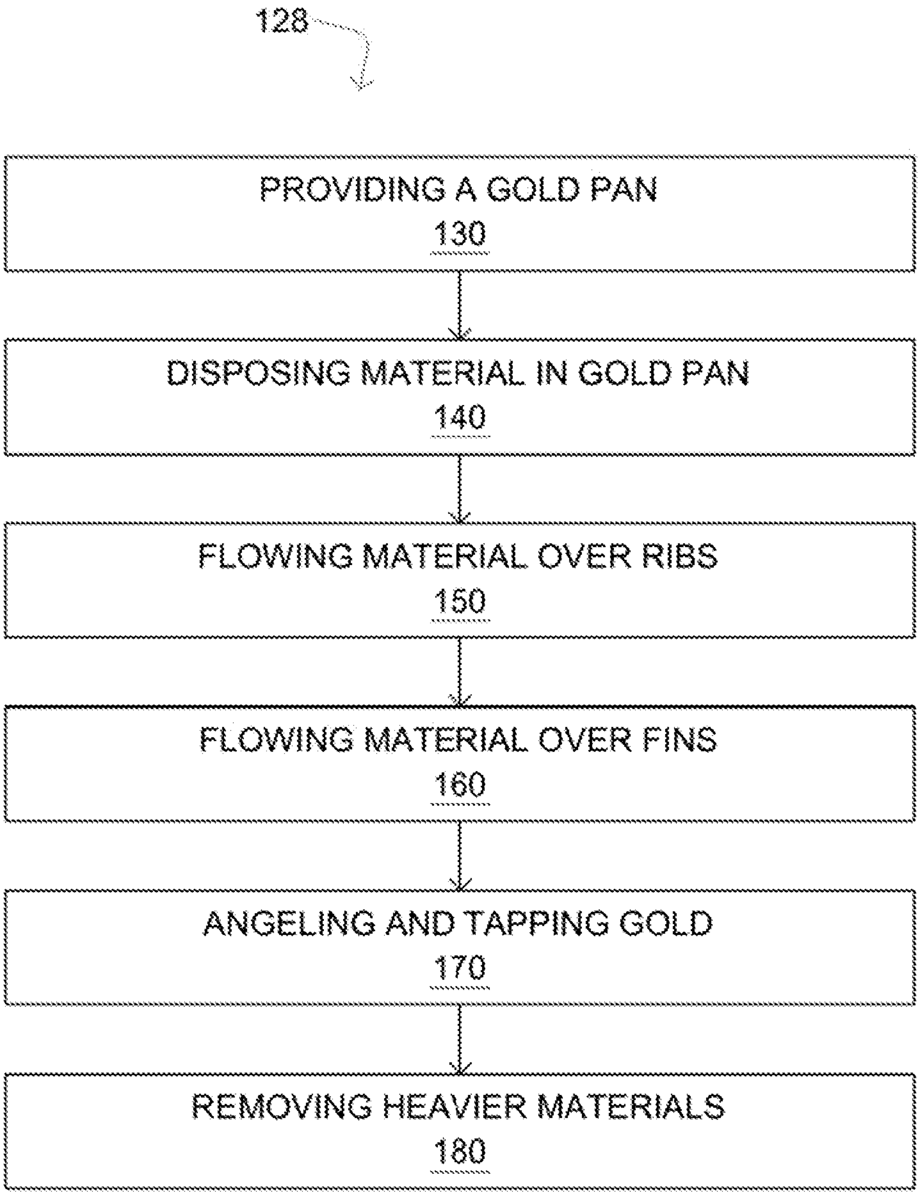
FIG. 6 is a flowchart of a method of panning for gold, according to one embodiment of the invention.
Figure 7:
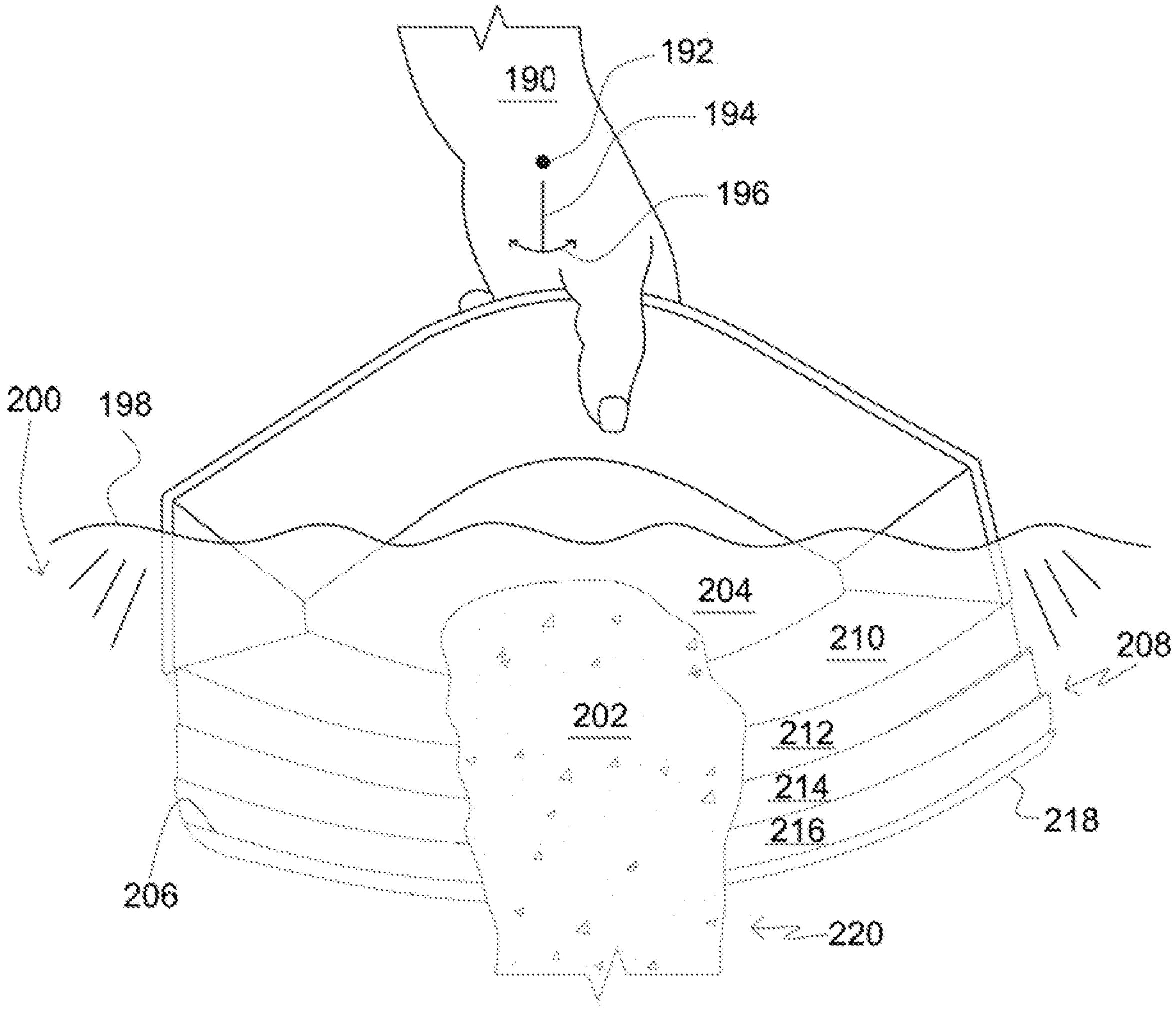
FIG. 7 illustrates pouring material over ribs, according to one embodiment of the invention.

Looking to FIGS. 6 and 7, FIG. 6 is a flowchart of a method of panning for gold and FIG. 7 illustrates pouring material over ribs, according to one embodiment of the invention. There is shown a method 128 of panning for gold using a gold pan including the steps of providing 130 a gold pan; disposing 140 material in the gold pan; flowing 150 material over the ribs; flowing 160 material over the fins; angling 170 and tapping the gold pan; and removing 180 heavier materials.

The step of providing 130 a pan may include providing a pan having a plurality of ribs extending upwardly and forwardly from a top of the pan, and/or wherein such a pan includes one or more of the features, structures, components, portions, or the like described herein. Such will generally be accomplished by giving such a pan to a user and may include providing instructions for such use.

The step of disposing 140 may include disposing particulate material within the pan. Such may be accomplished by scooping, shoveling, dumping, or otherwise placing material into the pan. The material is generally alluvial (stream/river bed) particulate/granular material (e.g. sand, dirt) and includes a mix of heavier and lighter materials, which might include gold or other heavy metals/minerals (e.g. black sand, which is generally made up of oxides of iron, magnetite and hematite).

The user may dispose of the particulate matter anywhere within the pan, however in most applications it may be most effective to deposit the particulate matter within the flat bottom 204 of the pan, or along one of the angled sides adjacent to the flat bottom 205 such that the material ends up resting on the flat bottom 204. This ensures that all of the material is behind each of the ribs, and that the material is in a position to be further restrained by a gate if the user decides to use one. If the user decides to use a gate, and decides to pour the material prior to installing the gate, the user would install the gate prior to moving on to flowing 150 material over the ribs.

Once the material is disposed within the reservoir, and any desired attachments for the pan have been assembled, the user may proceed to the next step. The step of flowing 150 material over the ribs may include tipping the pan forward within a body of water (an illustrative embodiment is shown in FIG. 7) such that the material is entirely submerged and then shaking/agitating the pan side-to-side (i.e. alternatingly back and forth along the rib, thereby liquifying the particulate material) or in an arc along the rib, e.g. wherein the rib has curvature thereto, and allowing the material to flow over the ribs, which releases the lighter materials into the water (generally back into the stream) while trapping the heavier materials in the rib cavities. Of note, the alternatingly back and forth along the rib motion is perpendicular to the flowing motion of the particulate material over the ribs. In other words, the user is not shaking the pan in the direction of the flow of material over the ribs, but instead is shaking it orthogonal to that direction to liquify the material (i.e. to suspend the material in the medium, generally water, in a manner that it behaves more like a liquid) and simply allowing gravity to carry the liquified particulate matter over the ribs. The user may then lift the pan out of the water while tipping the pan back upright to release the heavies back into the pan for inspection and/or further processing.

The illustrated gold pan is submerged in water 198 with the material 202 below the water line. The pan is tipped forward such that the material 202 flows 220 from a flat bottom 204 of the pan over a plurality of ribs 208 and then into the water 198 while the user's hand 190 pivots back and forth 196 about the wrist which is the center of rotational motion 192 this action from the hand is transmitted 194 to the pan and causes the pan to agitate 200 side to side within the water 198. The material flows in a thin layer, first over the first rib 212 which is coupled to the front wall 210 of the pan, then over the second rib 214, then over the third rib 216 and finally over the lip 206 of the final rib 218 and is thereby released. This provides multiple structures to capture heavies, with most heavies being captured by the first and second ribs 212, 214 (as used herein "second" ribs are different from "secondary" ribs).

When tilting the pan forward, the user may either maintain a consistent tilting angle while panning therewith or may progressively tilt the angle of the pan increasingly forward until substantially all of the liquified particulate material has flowed over the rib or ribs. Other embodiments may instead or in addition to the progressive tilting, stop tilting and hold the pan substantially in a tilted position with a consistent angle while additional particulate material is disposed within the reservoir. In some embodiments, the user may need to process more material than the device can hold, so the user may desire to hold the pan substantially in a tilted position with a consistent angle while additional particulate material is disposed within the reservoir. The user may continue to shake or otherwise agitate the pan side-to-side in order to continuously liquify the additional particulate matter as it is deposited within the reservoir. In embodiments where the device includes a gate panel, the additional material would be disposed behind the gate panel.

The user may desire to further finish the material once it has been separated over the ribs. Such further processing may include flowing 160 particulate material over a plurality of finishing fins disposed within the pan. The pan may be submerged or not but is agitated while tipping toward the fins and allowing the fins to help separate the heavier materials.

Other further processing may include collecting 170 particulate material in a corner of a flat bottom of the pan (i.e. where the flat bottom meets one of the walls of the pan) and then tipping the pan and tapping a side thereof to separate heavies within the particulate material. Generally, the heaviest materials will roll away from the corner while the lighter materials will remain in the corner. In some cases the effect is fairly spectacular in that gold that was buried or otherwise difficult to see may appear tumbling forward along the flat bottom.

The step of removing 180 heavies from the pan may include using a scoop, trowel, cup, bottle or other device for removing material from the pan. A particularly convenient device is a bulb-syringe which may be used wherein water remains in the pan along with the heavies and they may be suctioned out into the bulb which then may be expelled into a convenient container (e.g. small clear bottle). In other embodiments, the heavies may be removed by holding the device at an angle and tapping or otherwise manipulating them along one of the ribs until the heavies drop out the side of the ribs, or angling the device such that when the device is tapped or otherwise manipulated by the user, the heavies fall back into the pan for further refined processing.

The illustrated method of panning for gold provides an efficient and effective way to process material. The method of panning for gold includes the step of providing a gold pan. The gold pan includes a plurality of ribs and a plurality of finishing fins disposed opposite of the plurality of ribs, a funneling corner, a lip, a gate, and a flat bottom surface.

The illustrated method includes the step of disposing material into the gold pan and may include placing the gold pan in a body of water/fluid. The method includes the step of flowing the material over the plurality of ribs. This step may be repeated in order to accumulate heavies within the pan for later processing. The material is disposed within the gold pan, on top of the flat bottom surface, and is submerged under water. The user circulates and oscillates the gold pan under the water to move the material from the flat bottom surface towards the plurality of ribs. The user may utilize a gate disposed over the material and the flat bottom surface to ensure that the height of the material being moved over the plurality of ribs is not too great. This processed is continued until the desired amount of material is removed and separated.

Once the material has been through the step of flowing the material over the ribs, if the user is not satisfied with the amount of undesirable material remaining, the process of flowing the material over the ribs may be repeated, or if the user is satisfied with the remaining material, the user may decide to be finished with processing the material. However, oftentimes a small amount of undesirable material may be left behind with the heavies and it may be desirable to further process the material, however more finely than the ribs can process it. If desired, the material may be further processed by placing it back in the bottom of the pan and flowing the material over more refined fins to separate the last bit of material.

The illustrated method includes the step of flowing the material over the plurality of finishing fins. The material left over from flowing over the plurality of ribs is moved back down towards the flat bottom surface. This material is then circulated or oscillated towards the plurality of finishing fins. The plurality of finishing fins is designed to capture the fine grain heavier material from the material left over from flowing the material over the plurality of ribs. What remains after flowing the material over the plurality of finishing fins is the heavier desired material, such as gold.

The method of panning for gold using a gold pan includes the step of angling and tapping the gold pan to remove any other access material above the heavier desired material. The material left over from flowing the material over the plurality of ribs and the plurality of finishing fins is moved back down towards the flat bottom surface. Angling and tapping the gold pan removes excess material from above the heavier desired material. The method includes the step of removing heavier materials by pouring the material over a funneling corner and into a container.

The illustrated gold pan is partially submerged under water such that the material and the ribs are completely covered with water while the hand of the user is outside the water (generally panning streams include run-off water from melting ice and snow and therefore are very cold). The user tips the pan and oscillates the pan by wrist operation, thereby essentially liquefying the material within the water and allowing it to flow in a thin (thin with respect to the spacing between the ribs and depth of the cavities thereof such that material encounters and engages with each rib before traversing the same) sheet over the ribs, thereby trapping heavies and allowing light material to flow out.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

Finally, it is envisioned that the components of the device may be constructed of a variety of materials, including but not limited to plastics, rubbers, ceramics, metals, wood, fibers, composite materials, and the like and combinations thereof.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A method of panning, comprising the steps of:

a. providing a pan having a rib extending upwardly and laterally away from a reservoir of the pan wherein the pan includes a gate panel coupled between the reservoir and the rib which forms a gap between an edge of the gate panel and the rib;

b. disposing particulate material within the reservoir;

c. shaking the pan alternatingly back and forth along the rib; and d. tilting the pan in the direction of the rib, thereby flowing particulate material over the rib.

2. The method of claim 1, wherein the rib is part of a plurality of ribs extending upwardly and laterally away from the reservoir of the pan.

3. The method of claim 1, wherein the step of tilting the pan in the direction of the rib further includes progressively tilting an angle of the pan more in the direction of the rib until substantially all of the particulate material has flowed over the rib.

4. The method of claim 1, wherein the step of tilting the pan in the direction of the rib includes wherein the pan is held substantially in a tilted position with a consistent angle while additional particulate material is disposed within the reservoir.

5. The method of claim 1, wherein the pan is held substantially in a tilted position with a consistent angle while additional particulate material is disposed within the reservoir behind the gate panel.

6. The method of claim 1, wherein the gate panel is selectably removable from the pan.

7. The method of claim 1, wherein the pan includes a secondary rib located on a side different from the primary rib.

8. The method of claim 7, further comprising tilting the pan toward the secondary rib after the step of tilting the pan in the direction of the primary rib, thereby flowing residual particulate material over the secondary rib.

9. A method of panning, comprising the steps of:

a. providing a pan having a rib extending upwardly and laterally away from a reservoir of the pan wherein the pan includes a gate panel coupled between the reservoir and the plurality of ribs which forms a gap between an edge of the gate panel and the plurality of ribs;

b. disposing particulate material within the reservoir;

c. shaking the pan alternatingly back and forth along the rib; and d. tilting the pan in the direction of the rib to an angle wherein particulate material flows over the rib, thereby releasing less dense materials from the pan while trapping heavies behind the rib.

10. The method of claim 9, wherein the step of tilting the pan in the direction of the rib includes wherein the pan is held substantially in a tilted position with a consistent angle while additional particulate material is disposed within the reservoir.

11. The method of claim 10, wherein the rib is part of a plurality of ribs extending upwardly and laterally away from the reservoir of the pan.

12. The method of claim 9, wherein the step of tilting the pan in the direction of the rib further comprises disposing additional particulate material within the reservoir behind the gate panel.

13. The method of claim 12, wherein the gate panel is selectably removable from the pan.

14. The method of claim 13, wherein the pan includes a secondary rib located on a side different from the plurality of ribs.

15. The method of claim 14, further comprising tilting the pan toward the secondary rib after the step of tilting the pan in the direction of the rib, thereby flowing residual particulate material over the secondary rib.

16. A method of panning, comprising the steps of:

a. providing a pan having a plurality of ribs in an array extending upwardly and laterally away from a reservoir of the pan wherein the pan includes a gate panel that is selectably removably coupled between the pan reservoir and the plurality of ribs which forms a gap between an edge of the gate panel and the plurality of ribs;

b. disposing particulate material within the reservoir;

c. shaking the pan alternatingly back and forth along the plurality of ribs;

d. tilting the pan in the direction of the rib to an angle wherein particulate material flows over the rib, thereby releasing less dense materials from the pan while trapping heavies behind the rib; and e. holding the pan substantially in a tilted position with a consistent angle while additional particulate material is disposed within the reservoir.

17. The method of claim 16, wherein the pan includes a secondary rib located on a side different from the plurality of ribs and further comprising tilting the pan toward the secondary rib after the step of tilting the pan in the direction of the rib, thereby flowing residual particulate material over the secondary rib.

* * * * *